United States Patent
Liu et al.

(10) Patent No.: US 12,388,072 B2
(45) Date of Patent: Aug. 12, 2025

(54) ELECTROCHEMICAL APPARATUS AND ELECTRONIC APPARATUS

(71) Applicant: Ningde Amperex Technology Limited, Ningde (CN)

(72) Inventors: Shengqi Liu, Ningde (CN); Weiwei Li, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 639 days.

(21) Appl. No.: 17/697,482

(22) Filed: Mar. 17, 2022

(65) Prior Publication Data

US 2022/0376224 A1    Nov. 24, 2022

(30) Foreign Application Priority Data

Mar. 17, 2021    (CN) .............. 202110288434

(51) Int. Cl.
*H01M 4/13* (2010.01)
*H01M 4/02* (2006.01)
*H01M 4/64* (2006.01)
*H01M 10/0525* (2010.01)

(52) U.S. Cl.
CPC .............. *H01M 4/13* (2013.01); *H01M 4/64* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 6,682,856 B1 * | 1/2004 | Watanabe | H01M 10/0567 429/324 |
| 2005/0053833 A1 * | 3/2005 | Hayashida | H01M 4/139 429/209 |
| 2008/0160420 A1 | 7/2008 | Adachi et al. | |

(Continued)

FOREIGN PATENT DOCUMENTS

| | | |
|---|---|---|
| CN | 101847708 A | 9/2010 |
| CN | 102473901 A | 5/2012 |

(Continued)

OTHER PUBLICATIONS

Pengcheng Zhu, A review of current collectors for lithium-ionbatteries, Feb. 15, 2021,, Journal of power sources, vol. 485, ISSN: 0378-7753 (Year: 2021).*

(Continued)

*Primary Examiner* — Haroon S. Sheikh
(74) *Attorney, Agent, or Firm* — WHDA, LLP

(57) ABSTRACT

An electrochemical apparatus includes an electrode plate, where the electrode plate has a current collector and an active material layer disposed on at least one surface of the current collector, the active material layer has at least one pore, and an included angle between an axial direction of the at least one pore and a plane on which a surface of the active material layer lies is θ, where 0°≤θ<90°. This improves efficiency of the electrode plate in infiltration and absorption of the electrolyte, thereby improving rate performance, cycling performance, safety, stability, and other qualities of the electrochemical apparatus.

20 Claims, 1 Drawing Sheet

(56) References Cited

U.S. PATENT DOCUMENTS

| | | | |
|---|---|---|---|
| 2012/0135306 A1 | 5/2012 | Temmyo | |
| 2013/0149580 A1* | 6/2013 | Kim | H01M 50/463 |
| | | | 429/94 |
| 2013/0209888 A1 | 8/2013 | Nagai | |
| 2013/0288121 A1 | 10/2013 | Nagai et al. | |
| 2014/0038045 A1 | 2/2014 | Lee et al. | |
| 2014/0308582 A1* | 10/2014 | Satow | H01M 4/133 |
| | | | 429/217 |
| 2015/0072232 A1 | 3/2015 | Nagai | |
| 2015/0188145 A1* | 7/2015 | Furutani | C22C 21/00 |
| | | | 148/692 |
| 2016/0211510 A1* | 7/2016 | Ikeda | H01M 4/386 |
| 2017/0040614 A1 | 2/2017 | Morishima et al. | |
| 2018/0083287 A1* | 3/2018 | Chiang | H01M 4/587 |
| 2019/0221834 A1* | 7/2019 | Hara | H01M 4/36 |
| 2019/0245200 A1* | 8/2019 | Baba | H01M 4/485 |
| 2020/0006756 A1 | 1/2020 | Huang et al. | |
| 2020/0313155 A1 | 10/2020 | Zhang et al. | |
| 2021/0202934 A1* | 7/2021 | Jeong | H01M 4/043 |
| 2022/0069284 A1 | 3/2022 | Yang et al. | |
| 2022/0173402 A1* | 6/2022 | Jang | H01G 11/38 |

FOREIGN PATENT DOCUMENTS

| | | |
|---|---|---|
| CN | 103155238 A | 6/2013 |
| CN | 103329314 A | 9/2013 |
| CN | 103700863 A | 4/2014 |
| CN | 104205466 A | 12/2014 |
| CN | 106450425 A | 2/2017 |
| CN | 106531961 A | 3/2017 |
| CN | 206349443 U | 7/2017 |
| CN | 108400284 A | 8/2018 |
| CN | 108682785 A | 10/2018 |
| CN | 109546084 A | 3/2019 |
| CN | 110660955 A | 1/2020 |
| CN | 110660994 A | 1/2020 |
| CN | 110661030 A | 1/2020 |
| CN | 110752345 A | 2/2020 |
| CN | 111244392 A | 6/2020 |
| CN | 111883753 A | 11/2020 |
| CN | 112018324 A | 12/2020 |
| CN | 112151748 A | 12/2020 |
| CN | 113972422 A | 1/2022 |
| EP | 3 588 624 A1 | 1/2020 |
| EP | 3 951 930 A1 | 2/2022 |
| JP | 6351050 B1 | 7/2018 |
| WO | 2008/018204 A1 | 2/2008 |
| WO | 2011/121950 A1 | 10/2011 |
| WO | 2020/133671 A1 | 7/2020 |
| WO | 2020/238628 A1 | 12/2020 |

OTHER PUBLICATIONS

First Office Action dated Dec. 9, 2021, issued in counterpart CN Patent Application No. 202110288434.6, w/ English translation (18 pages).

Notice of Allowance dated Apr. 26, 2022, issued in counterpart CN Application No. 202110288434.6. (4 pages).

Extended European Search Report dated Sep. 8, 2022, issued in EP Application No. 22162802.7.

A Basic Guide to Particle Characterization, Malvern Instruments Worldwide—White Paper, pp. 1-26, May 2, 2012; cited in Extended European Search Report dated Sep. 8, 2022.

* cited by examiner

ELECTROCHEMICAL APPARATUS AND ELECTRONIC APPARATUS

CROSS REFERENCE TO THE RELATED APPLICATIONS

This application claims the benefit of priority frim the Chinese Patent Application No. CN202110288434.6, filed on 17 Mar. 2021, the entire content of which is incorporated herein by reference.

TECHNICAL FIELD

This invention relates to the field of electrochemical apparatuses, and specifically, to an electrode plate, an electrochemical apparatus, and an electronic apparatus.

BACKGROUND

In recent years, with continuous development of technology products such as mobile phones and automobiles, electrochemical apparatuses such as batteries are required to have higher and higher energy density. In the research and development of high energy density batteries, increasing the active material content per unit area of an electrode plate is a relatively direct manner. Therefore, at present, a main manner is to increase the amount, thickness or compacted density of an active material layer (a coating containing active material) on the electrode plate, to increase extractable capacity of the electrode plate per unit of mass or volume, thereby achieving a purpose of increasing energy density of the electrochemical apparatus.

The coating method is a common method for preparing an electrode plate. In the preparation process, generally, a slurry including active material is applied on an electrode current collector, and then processed by drying, and mill rolling/cold pressing to form an active material layer on the electrode current collector, thereby preparing an electrode plate. In the above mill-rolling process, the active material is subject to greater pressure when it is farther away from the electrode current collector, so that the formed active material layer has lower porosity when it is closer to the current collector, resulting in problems such as conventional electrode plates having low efficiency in infiltration and absorption of electrolyte, increasing diffusion paths of lithium ions in the electrode plate, increasing ionic polarization, slow migration of lithium ions and high internal resistance of a battery. Therefore, the electrochemical apparatus has poorer kinetic performance, which in turn causes problems such as poor rate performance, poor cycling performance, and easy lithium precipitation of the electrochemical apparatus. Particularly, under conditions of low temperature charge/discharge and high current density, lithium dendrites are more easily formed, bringing relatively high safety hazards to the electrochemical apparatus. Particularly, such problems are more prominent with increasing thickness of the active material layer of the electrode plate.

To solve the foregoing problems, existing solutions are mainly to perforate the electrode plate vertically to form pore-like structures in the active material layer of the electrode plate, where a direction of the hole is perpendicular to the electrode plate (that is, an axis of the hole is perpendicular to the surface of the active material layer), or to punch holes into the surface of the electrode plate by using a salient point cold presser, that is, creating concave-convex marks on the surface of the active material layer, which is similar to the vertical perforation method. However, such existing solutions usually require increased thickness of the electrode plate (otherwise it is easy to penetrate the current collector). In addition, such solutions are apt to cause pressure on the current collector, which reduces the strength of the current collector, and even penetrates the electrode plate and damages the current collector, so that the electrode plate and electrochemical apparatus are still subject to relatively high safety hazards.

SUMMARY

This invention provides an electrochemical apparatus, which can not only improve efficiency of an electrode plate in infiltration and absorption of electrolyte, but also avoid defects such as degraded safety of the electrode plate caused by the existing vertical perforation method, thereby having good performance at rate performance, cycling performance and safety.

According to one aspect of this invention, an electrochemical apparatus is provided, including an electrode plate, where the electrode plate has a current collector and an active material layer disposed on at least one surface of the current collector, the active material layer has at least one pore, and an included angle between axial direction of the at least one pore and a plane on which a surface of the active material layer lies is $\theta$, where $0°\leq\theta<90°$.

According to some embodiments of this invention, the electrochemical apparatus includes an electrolyte, and $1.3\leq(D50\times10+THK)/(d\times100+k)\leq45$, where D50 is an average particle size of active materials in the active material layer, THK is a thickness of the active material layer, d is a pore diameter of the at least one pore, and k is a conductivity of the electrolyte.

According to some embodiments of this invention, at least one of the following conditions is satisfied: the pore diameter of the at least one pore ranges from 0.01 mm to 0.2 mm; the average particle size D50 of active materials in the active material layer ranges from 0.1 μm to 20 μm; the thickness of the active material layer ranges from 30 μm to 200 μm; and the electrochemical apparatus includes an electrolyte, where the conductivity of the electrolyte ranges from 7 S/m to 14 S/m.

According to some embodiments of this invention, the at least one pore extends from a first side of the active material layer to a second side of the active material layer, where a direction from the first side to the second side is parallel to a width direction of the electrode plate and parallel to the plane on which the surface of the active material layer lies.

According to some embodiments of this invention, the at least one pore includes a plurality of pores, where the plurality of pores include a through hole running through the first side and the second side of the active material layer, and/or a semi-through hole running through only the first side of the active material layer.

According to some embodiments of this invention, porosity of the active material layer ranges from 10% to 50%.

According to some embodiments of this invention, the at least one pore includes a plurality of pores, where the plurality of pores include a pore whose $\theta$ is equal to 0°.

According to some embodiments of this invention, tensile strength of the current collector is not less than 100 MPa.

According to some embodiments of this invention, the electrochemical apparatus is a lithium-ion battery.

According to another aspect of this invention, an electronic apparatus is further provided, including the foregoing electrochemical apparatus.

The electrochemical apparatus provided in this invention has a specific pore-path structure in the active material layer of the electrode plate, which can increase porosity of the electrode plate, improve efficiency of the electrode plate in infiltration and absorption of the electrolyte, increase the migration of lithium ions, and reduce internal resistance of the battery, so as to avoid formation of lithium dendrites and other problems, thereby improving rate performance, cycling performance, safety, and stability of the electrochemical apparatus. In addition, this invention can also avoid defects existing in the prior art such as causing damage to the current collector of the electrode plate. This has greater practical significance in the industry.

Reference signs are described as follows: 1. current collector; 2. active material layer; 3. pore; 4. tab.

DETAILED DESCRIPTION

To enable a person skilled in the art to better understand the solutions of this invention, this invention is further described in detail below with reference to the accompanying drawings.

Figure 1:
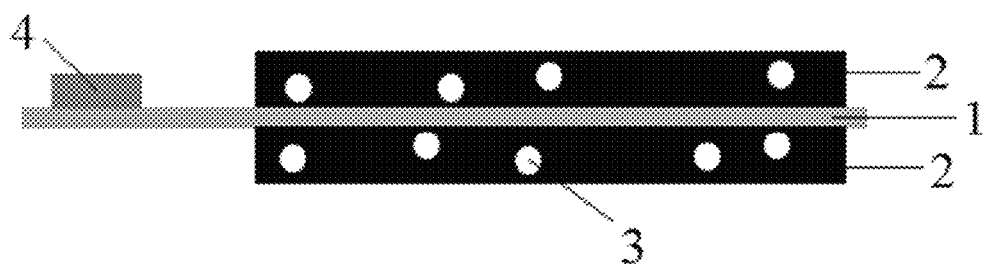
FIG. 1 is a schematic cross-sectional view of a side of an electrode plate according to an embodiment of this invention.
Figure 2:
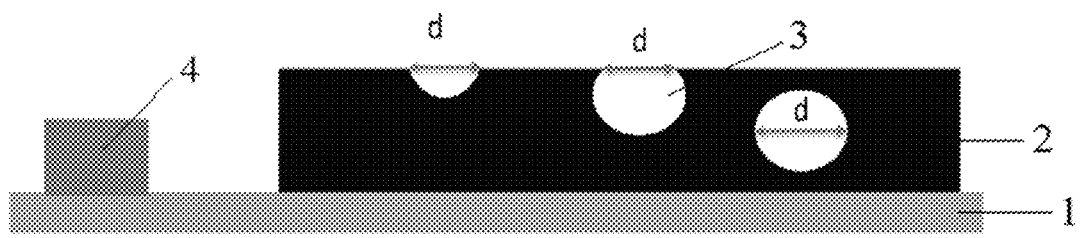
FIG. 2 is a schematic cross-sectional view of a side of an electrode plate according to another embodiment of this invention.

According to an aspect of this invention, an electrochemical apparatus is provided. As shown in FIG. 1 and FIG. 2, the electrochemical apparatus includes an electrode plate, where the electrode plate includes a current collector 1 and an active material layer 2 disposed on at least one surface of the current collector, the active material layer 2 has at least one pore 3, and an included angle between an axial direction of the at least one pore 3 and a plane on which a surface of the active material layer 2 lies is $\theta$, where $0°\leq\theta<90°$. The at least one pore 3 is a cylindrical pore, and the axial direction of the at least one pore 3 is a central axial direction of the cylindrical pore.

According to the electrochemical apparatus provided in this invention, the at least one pore with the above specific structure is designed in the active material layer of the electrode plate, which can optimize a pore structure in the electrode plate, and increase porosity of the electrode plate, thereby optimizing distribution of electrolyte in the electrode plate, reducing diffusion paths of lithium ions, reducing ionic polarization, increasing migration of lithium ions, reducing internal resistance of a battery, improving kinetic characteristics of the electrochemical apparatus, and improving rate performance, cycling performance, safety and stability of the electrochemical apparatus.

In some embodiments, the electrochemical apparatus includes an electrolyte, and satisfies $1.3\leq(D50\times10+THK)/(d\times100+k)\leq45$ where D50 is an average particle size of active material in the active material layer. THK is a thickness of the active material layer, d is a pore diameter of the at least one pore, and k is a conductivity of the electrolyte. After research and analysis, the inventors believe that D50 and THK mainly affect diffusion paths of ions (for example, lithium ions) in the electrode plate, and d and k mainly affect storage capacity and diffusion rate of the ions in the electrolyte. When D50 and/or THK is relatively large, and d and/or k is relatively small, resulting in a relatively large value of $(D50\times_{10}+THK)/(d\times100+k)$, polarization of the electrode plate is relatively large, paths of solid phase diffusion and liquid phase diffusion of the ions (for example, lithium ions) in the active material are relatively long, and diffusion impedance is relatively serious, affecting kinetic characteristics of the electrochemical apparatus. According to the research in this invention, when $1.3\leq(D50\times_{10}+THK)/(d\times100+k)\leq45$ holds true, the kinetic characteristics, energy density, and safety of the electrochemical apparatus can be further improved.

In some embodiments, the foregoing electrolyte may include a lithium salt and a non-aqueous solvent, and concentration of the lithium salt in the electrolyte may generally range from 0.7 mol/L to 1.4 mol/L. For example, the lithium salt may include at least one of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoro borate. The non-aqueous solvent may be a carbonate compound, a carboxylate compound, an ether compound, another organic solvent, or a combination thereof. The carbonate compound may be a linear carbonate compound, a cyclic carbonate compound, a fluorocarbonate compound, or a combination thereof. An example of the linear carbonate compound is dimethyl carbonate (DMC), diethyl carbonate (DEC), dipropyl carbonate (DPC), methyl propyl carbonate (MPC), ethylene propyl carbonate (EPC), ethyl methyl carbonate (EMC), and a combination thereof. An example of the cyclic carbonate compound is ethylene carbonate (EC), propylene carbonate (PC), butylene carbonate (BC), vinyl ethylene carbonate (VEC), and a combination thereof. An example of the fluoro carbonate compound is fluoro ethylene carbonate (FEC), 1,2-difluoro ethylene carbonate, 1,1-difluoro ethylene carbonate, 1,1,2-trifluoro ethylene carbonate, 1,1,2,2-tetrafluoro ethylene carbonate, 1-fluoro-2-methyl ethylene carbonate, 1-fluoro-1-methyl ethylene carbonate, 1,2-difluoro-1-methyl ethylene carbonate, 1,1,2-trifluoro-2-methyl ethylene carbonate, trifluoromethylene carbonate, and a combination thereof. An example of the carboxylate compound is methyl formate, methyl acetate, ethyl acetate, n-propyl acetate, tert-butyl acetate, methyl propionate, ethyl propionate, propyl propionate, γ-butyrolactone, decanolide, valerolactone, mevalonide, caprolactone, and a combination thereof. An example of the ether compound is dibutyl ether, tetraglyme, diglyme, 1,2-dimethoxyethane, 1,2-diethoxyethane, ethoxy methoxyethane, 2-methyltetrahydrofuran, tetrahydrofuran, and a combination thereof. An example of the another organic solvent is dimethyl sulfoxide, 1,2-dioxolane, sulfolane, methyl sulfolane, 1,3-dimethyl-2-imidazolidinone, n-methyl-2-pyrrolidone, formamide, dimethylformamide, acetonitrile, trimethyl phosphate, triethyl phosphate, trioctyl phosphate, phosphate, and a combination thereof.

Generally, the at least one pore 3 may be a closed pore located in the active material layer 2 of the electrode plate (for example, the rightmost pore shown in FIG. 2, that is, the pore farthest from a tab 4), or may be a non-closed pore located on the surface of the active material layer 2 of the electrode plate (for example, the two pores on the left in FIG. 2, that is, the two pores near the tab 4). To further optimize the kinetic characteristics of the electrochemical apparatus, when the at least one pore 3 is located on the surface of the active material layer 2 of the electrode plate (that is, when the pore is a non-closed pore), d may generally mean a length of a boundary line of the at least one pore 3 on the surface of the active material 2; and when the at least one pore 3 is located in the active material layer 2 of the electrode plate (that is, when the at least one pore is a closed pore), d is a pore diameter of the at least one pore.

The pore diameter of the at least one pore 3 is not greater than the thickness of the active material layer 2 (that is, d≤THK), which is beneficial to the safety and capacity of the electrochemical apparatus. In some embodiments, the pore diameter of the at least one pore 3 is generally not less than 0.01 mm, and preferably ranges from 0.01 mm to 0.2 mm. For example, it may be 0.01 mm, 0.02 mm, 0.03 mm, 0.04 mm, 0.05 mm, 0.06 mm, 0.07 mm, 0.08 mm, 0.1 mm, 0.12 mm, 0.15 mm, 0.18 mm, 0.2 mm, or a range formed by any two of the above values. Such pore structure (or pore-like structure) is mainly used to improve distribution of pores in the electrode plate, retain the electrolyte, provide sufficient paths for ions, and reduce the polarization of the electrode plate. If the pore diameter of the at least one pore is too small (<0.01 mm), an improvement on the distribution of the pores and retention of the electrolyte is relatively limited. However, if the pore diameter of the at least one pore is too large (>0.2 mm), the volume of electrode plate is apt to be wasted, further reducing energy density and cycling performance of the battery.

In this invention, the pore diameter of the at least one pore means a diameter of the pore. Specifically, the cross section of the pore (a plane on which the cross section lies is perpendicular to an axial direction of the pore) is substantially circular, and the pore diameter means a diameter of the circular cross section.

In some embodiments, the average particle size D50 of the active materials in the active material layer 2 may range from 0.1 μm to 20 μm. For example, it may be 0.1 μm, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, or a range between any two of the above values. The active material in the active material layer is granular. If its particle size/dimension is too large (>20 μm), a diffusion path of ions (for example, lithium ions) from the inside of the particle to the outer surface of the particle is too long, and the ion solid-phase diffusion impedance increases, which also increases the polarization of the electrode plate to some extent. If its particle size is too small (<0.1 μm), the active material is a nano material, it is not conducive for the active material to evenly distribute (when the electrode plate is being prepared by the coating method or other methods, the nano material tends to agglomerate in the formed slurry, so that the active material in the electrode plate is unevenly distributed), the specific surface area of the active material in the electrode plate is large, and side reactions with the electrolyte increase, affecting high temperature storage performance and other characteristics of the electrode plate. Therefore, controlling the average particle size of the active material in the active material layer within a range of 0.1 μm to 20 μm helps to improve the overall quality of the electrochemical apparatus such as rate performance, cycling performance, and stability.

The electrode plate in this invention may particularly be a electrode plate with a thickness of not less than 30 Ian. To improve the kinetic characteristics of a battery cell using this type of thick electrode, the thickness of the active material layer can be designed according to actual needs. In some embodiments, the thickness of the active material layer 2 (that is, THK) may generally range from 30 μm to 200 μm. For example, it may be 30 μm, 35 μm, 40 μm, 45 μm, 50 μm, 55 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm or a range between any two of the above values. Research shows that the active material layer being too thick (>200 μm) or too thin (<30 μm) affects the cycling performance and other performances of the electrochemical apparatus to some extent, and the active material layer being too thin also affects safety of the electrochemical apparatus. Therefore, controlling the thickness of the active material layer within the above range helps to further improve the quality of the electrochemical apparatus such as cycling performance and safety.

In some embodiments, the conductivity of electrolyte k may generally range from 7 S/m to 14 S/m (that is, 7 S/m≤k≤14 S/m), for example, 7 S/m, 8 S/m, 9 S/m, 10 S/m, 11 S/m, 12 S/m, 13 S/m, 14 S/m, or a range between any two of these values. If the conductivity of the electrolyte is too low (k<7 S/m), the migration of the ions is slow, and concentration difference of the ions is huge. If the conductivity is too large (k≤14 S/m), the electrolyte has poor stability and more side reactions, easily accelerating cycle fading (cycle fading) of the electrochemical apparatus. Therefore, controlling k within a range from 7 S/m to 14 S/m helps to achieve a balance between transfer efficiency of the ions and capacity retention and safety of the electrochemical apparatus.

Further research shows that, the at least one pore 3 extends from a first side of the active material layer 2 to a second side of the active material layer 2, where a direction from the first side to the second side is parallel to a width direction of the electrode plate and parallel to the plane on which the surface of the active material layer 2 lies. Such condition helps to improve ability of the electrode plate in infiltration and absorption of the electrolyte, thereby improving kinetic characteristics of the electrochemical apparatus.

In some embodiments, the at least one pore 3 includes a plurality of pores, where the plurality of pores 3 include a through hole running through a first side of the active material layer 2 and a second side of the active material layer 2, and/or a semi-through hole running through only the first side of the active material layer 2. That is, two ends of the through hole are respectively located on the first side and the second side of the active material layer 2, one end of the semi-through hole is located on the first side of the active material layer 2, and the other end is located inside the active material layer 2 (that is, the semi-through hole extends from the first side of the active material layer 2 to the second side of the active material layer 2, only penetrating the first side but not penetrating the second side).

Specifically, a tab 4 is also disposed on the electrode plate, where the tab 4 may be disposed at one end of the electrode plate, or may be disposed at any position in the middle of the electrode plate and surrounded by the active material layer 2. As shown in FIG. 1 and FIG. 2, in some embodiments, the tab 4 is disposed at one end of the electrode plate, and the active material layer is located on one side of the tab. A direction from the end of the electrode plate with a tab disposed to the end with no tab disposed (opposite the end with a tab) is a length direction of the electrode plate. A width direction of the electrode plate is perpendicular to the length direction of the electrode plate, the length direction of the electrode plate is generally a length direction of the active material layer 2, and the width direction of the electrode plate is the width direction of the active material layer 2.

Specifically, the axial direction of the at least one pore 3 may be parallel to the plane on which the surface of the active material layer 2 lies (that is, θ=0°), or may be inclined relative to the plane on which the surface of the active material layer 2 by an angle θ (0°≤θ<<90°). For example, θ may be 0°, 5°, 10°, 150, 20°, 25°, 30°, 35°, 40°, 45°, 50°, 55°, 60°, 65°, 70°, 75°, 80°, 85° or a range between any two of the above values, and preferably, 0°≤θ≤60°.

In some embodiments, the at least one pore includes a plurality of pores, where the plurality of pores include a pore whose θ is equal to 0°, helping to further improve safety and cycling performance of the electrochemical plate at the same time.

Generally, the at least one pore 3 includes a plurality of pores, minimum distances from the plurality of pores 3 to the surface of the current collector 1 may not be the same (as shown in FIG. 1 and FIG. 2).

According to this invention, different numbers of pores may be distributed in different areas of the active material layer according to needs, so as to improve local porosity and liquid retention of the electrolyte, increase migration rate of the ions, reduce polarization of battery cells, and improve kinetic characteristics of the battery cells. For example, in some embodiments, at least a first area closer to the tab 4 and a second area farther away from the tab 4 may be disposed, and more pores are disposed in the first area than the second area (as shown in FIG. 1), so that the number of pores presents a gradient distribution in the direction leaving the tab, thereby achieving a good effect on improving the kinetic characteristics of the electrochemical apparatus.

The at least one pore 3 is used to improve distribution of the pores of the electrode plate. Generally, when the number of pores 3 is larger, the improvement effect on the kinetic characteristics of the electrochemical apparatus is better. However, an excessive number of pores 3 also affects the energy density of the electrochemical apparatus to some extent. Considering such factors comprehensively, in some embodiments, the porosity of the active material layer is generally controlled to be from 10% to 50%, for example, 10%, 20%, 30%, 40%, 50%, or a range between any two of the above values. It should be noted that the porosity is the overall porosity of the active material layer 2, that is, the porosity caused by all pore-like structures such as the pores 3 existing in the active material layer 2 and other possible pores.

In this invention, an active material layer may be disposed on one surface of the current collector, or an active material layer may be disposed on each of two surfaces of the current collector, which can be set according to needs in a specific implementation. In a specific implementation of this invention, as shown in FIG. 1, an active material layer 2 is disposed on each of two surfaces of the current collector 1, and pores are provided on the two surfaces of the active material layer 2, which can improve both the kinetic characteristics and energy density of the electrochemical apparatus.

Generally, if the tensile strength of the current collector is too small (<100 MPa), it may not meet the processing strength requirements for preparing the electrode plate, and problems such as damage to the current collector may occur. For example, when the tensile strength of the current collector ranges from 100 MPa to 250 MPa, the electrode plate is subject to a slight light transmission, bringing safety risks. According to the research of this invention, controlling the tensile strength of the current collector to be not less than 100 MPa, for example, 100 MPa, 130 MPa, 150 MPa, 180 MPa, 200 MPa, 230 MPa, 250 MPa, 280 MPa, 300 MPa, or a range between any two of the above values, helps to improve efficiency of the electrode plate in absorption and infiltration of the electrolyte, safety, and other characteristics, thereby improving comprehensive qualities of the electrochemical apparatus.

In some embodiments, the electrode plate also has a base coating layer, the base coating layer is located between the surface of the current collector 1 and the active material layer 2, and the base coating layer generally includes a binder of high concentration, so as to enhance the adhesion with the current collector, further improving safety and other performance of the electrochemical apparatus. In some embodiments, a raw material of the base coating layer includes a conductive agent and a binder. Based on a total mass of the base coating layer, generally, a mass percentage of the binder in the base coating layer is not less than 30%. For example, it may be 30%, 35%, 40%, 45%, or a range between any two of the above values. The rest of the mass may be the conductive agent.

In some embodiments, a raw material of the active material layer 2 includes a conductive agent, a binder, and the active material. Based on a total mass of the active material layer 2, a mass percentage of the active material ranges from 94% to 98%, a mass percentage of the conductive agent ranges from 1% to 3%, and a mass percentage of the binder ranges from 1% to 3%.

In this invention, the conductive agent and binder in the active material layer and the base coating layer may be conventional materials in the art. For example, the conductive agent may be conductive carbon black (SP), or the like, and the binder may be at least one of polyvinylidene fluoride (PVDF), styrene butadiene rubber (SBR), sodium carboxymethyl cellulose (CMC), and the like.

In this invention, the electrode plate may be a positive electrode plate (or a cathode electrode plate) or a negative electrode plate (or an anode electrode plate), or may be a positive electrode plate and a negative electrode plate (that is, the electrochemical apparatus includes a positive electrode plate with the at least one pore and a negative electrode plate with the at least one pore). In some embodiments, the electrode plate is a positive electrode plate, the active material of the active material layer may include at least one of lithium cobalt oxide, nickel cobalt manganese ternary material, nickel cobalt aluminum ternary material, lithium iron phosphate, lithium manganate, and lithium iron manganese phosphate, and the current collector may be a conventional positive electrode current collector in the art such as an aluminum foil. In other some embodiments, the electrode plate is a negative electrode plate, the active material of the active material layer may include at least one of graphite, mesophase carbon microspheres, silicon material, and silicon carbide material, and the current collector may be a conventional negative electrode current collector in the art such as a copper foil.

The electrode plate of this invention may be prepared by conventional methods in the art such as the coating method. In some embodiments, the slurry including the raw material of the active material layer may be applied to the current collector. In addition, according to parameters such as the shape, distribution position, and number of the preset pores, a steel wire with the same diameter as the pore diameter of the at least one pore is placed on the current collector or in the slurry applied to the current collector. After being processed by drying and mill rolling, the steel wire is drawn out from the active material layer formed on the current collector, to form the pore in the active material layer, thereby preparing the electrode plate. The solvent used to form the slurry may be N-methylpyrrolidone (NMP), water, or other conventional solvents in the art.

The electrochemical apparatus of this invention may be a battery, and specifically a lithium-ion battery. The electrochemical apparatus may be prepared according to conventional methods in the art. For example, a bare cell is prepared by stacking and winding the positive electrode plate, the separator, and the negative electrode plate. Then a fully infiltrated cell is obtained after packaging, liquid injection, being left standing and other processes, so that an SEI film is formed on the surface of the anode (negative electrode), thereby activating the battery to be in a state of charge, that is, a lithium-ion battery is obtained.

According to another aspect of this invention, an electronic apparatus is provided, including the foregoing electrochemical apparatus, that is, the electrochemical apparatus according to any of the foregoing embodiments, or the electrochemical apparatus according to other embodiments without departing from the scope of the essence of this invention.

To make the objectives, technical solutions, and advantages of this invention clearer, the following clearly describes the technical solutions in this invention with reference to the embodiments of this invention. Apparently, the described embodiments are some but not all of the embodiments of this invention. All other embodiments obtained by a person of ordinary skill in the art based on the embodiments of this invention without creative efforts shall fall within the protection scope of this invention.

The electrode plate and battery of Example 1 to Example 39 were manufactured according to the following processes:
(1) Preparation of a Cathode Electrode Plate Lithium cobalt oxide, polyvinylidene fluoride, and SP were put in NMP at a weight ratio of 97:1.5:1.5 and mixed thoroughly to form a uniform positive electrode slurry.

A plurality of stainless steel wires with a diameter of 0.05 mm were put on the front and back surfaces of a positive current collector (aluminum foil), and then the positive electrode slurry was applied to the front and back surfaces of the positive current collector to form a uniform coating layer. After being processed by drying and cold pressing, the stainless steel wires were drawn out from the active material layer formed on the two surfaces, to form a plurality of pores in the active material layer on the two surfaces, and then a tab was welded at the preset tab position of a cathode electrode plate (at one end of the cathode electrode plate) to obtain a cathode electrode plate.
(2) Preparation of an Anode Electrode Plate Graphite material, styrene butadiene rubber (SBR), and sodium carboxymethyl cellulose (CMC) were put in deionized water at a weight ratio of 97.4:1.2:1.4 and mixed thoroughly to form a uniform negative electrode slurry. The negative electrode slurry was applied to a negative electrode current collector (copper foil) that had been coated with a base coating layer. After being processed by drying and cold pressing, the anode electrode plate was obtained. The base coating layer was formed by mixing SR CMC, and SBR at a mass ratio of 60:5:35 and then applying the obtained slurry to the two surfaces of the current collector by the gravure coating method.
(3) Preparation of a Battery The anode electrode plate, the separator, and the cathode electrode plate were stacked in order and then welded to prepare a bare cell. A fully infiltrated cell is obtained after packaging, liquid injection (that is, electrolyte injection), and being left standing. After the steps of chemical formation and capacity, an SEI film is formed on the surface of the anode, a lithium-ion battery is activated and runs in a state of charge, to obtain the lithium-ion battery. Conductivity of the electrolyte is k=11 S·cm. The electrolyte includes a non-aqueous solvent and $LiPF_6$. The concentration of $LiPF_6$ in the electrolyte is 1 mol/L. The non-aqueous solvent is composed of DMC, EMC, DEC, and EC at a mass ratio of 1:1:1:1.

In each example, an included angle θ between an axis of the at least one pore and a plane on which a surface of the active material layer lies, a pore diameter d of the at least one pore, a state of the pore (a through hole or semi-through hole), a average particle size D50 of the positive active material, thickness THK of active material layer, porosity of the active material layer, tensile strength of the current collector, and conductivity k of the electrolyte are shown in Table 1.

Comparative Example 1

The difference between Comparative Example 1 and the examples was that in the preparation process of step (1) Preparation of a cathode electrode plate, no stainless steel wires were put on the front and back surfaces of the positive electrode current collector (that is, the cathode electrode plate did not have the pores). A average particle size D50 of the positive active material, thickness of active material layer THK porosity of the active material layer, tensile strength of the current collector, and conductivity k of the electrolyte are shown in Table 1.

Comparative Example 2

The difference between Comparative Example 2 and Example 1 was that the conventional vertical perforation method was used to form pores in the active material layer (that is, the included angle between the axial direction of the pores and the plane on which the surface of the active material layer lies was θ=90°). Other conditions were the same as those in Example 1.

Performance tests on the batteries of each example and comparative example were performed according to the following processes:

(1) Capacity retention at 1 C (at 25° C.): The battery was left standing for 5 min; discharged to 3 V at a constant current of 0.2 C; left standing for 5 min; charged to 100% SOC at a constant current of 0.5 C, charged to 0.025 C at a constant voltage; left standing for 5 min; discharged to 0% SOC at a constant current of 1 C; and left standing for 5 min. Discharge capacity at 1 C was recorded, and the capacity retention at 1 C was calculated. The results are shown in Table 1.

(2) Cycling test at 25° C.: At 25° C., the battery was discharged to 3.0 V at 1.0 C, let standing for 5 min, charged to 4.48 V at 0.7 C, then charged to 0.025 C at a constant voltage, and let standing for 5 min. The above process is taken as a cycle. The discharge capacity after the fourth cycle was recorded as 100%, and the number of cycles when the discharge capacity was 80% was recorded. The results are shown in Table 1.

(3) Overcharge test: The test voltage (OCV) of the battery cell was measured before the test, the appearance of the battery was checked and photographed, the battery was discharged to 3.0 V at 0.2 C, left standing for 20 min. charged to 10 V at a constant current of 0.5 C, and charged at 10 V constant voltage for 7 h. The OCV and temperature changes were monitored during the overcharge process. If there was no smoke, fire or explosion, the test succeeded. According to the overcharge test process, 10 cells were measured for each example and comparative example, and the overcharge test pass rate of each example and comparative example was recorded ($x_1/10$, where $x_1$ is the number of cells that passed the test). The results are shown in Table 1.

(4) Hotbox (Hotbox) test: In an environment of 25≅5° C., the battery was discharged to 3.0 V at 0.2 C, let standing for 5 min, and charged to 4.48 V with constant current and voltage at 1.5 C, where the current ≤0.05 C; then the battery was let standing for 60 min at 25±5° C. OCV and IMP of the battery was recorded, and the appearance of the battery was checked and photographed; then the temperature was increased to 132° C.±2° C. at a rate of 5° C.±2° C./min, and kept for 60 min. If the battery did not smoke, caught fire or exploded, it was considered as passed. In the above hotbox test process, 10 batteries were measured for each example and comparative example, and the pass rate of the hotbox test of each example and comparative example was recorded ($x_2/10$, where $x_2$ is the number of batteries that passed the test). The results are shown in Table 1.

TABLE 1

| Example | θ (°) | Conductivity of electrolyte k (S · cm) | Average particle size of active material D50 (μm) | Thickness of active material layer THK (μm) | Pore diameter of pore d (mm) | (D50*10 + THK)/(d*100 + k) | State of pore |
|---|---|---|---|---|---|---|---|
| Example 1 | 0 | 10 | 10 | 60 | 0.1 | 12.67 | through hole |
| Example 2 | 10 | 10 | 10 | 60 | 0.1 | 12.13 | through hole |
| Example 3 | 40 | 10 | 10 | 60 | 0.1 | 13.65 | through hole |
| Example 4 | 60 | 10 | 10 | 60 | 0.1 | 3.31 | through hole |
| Example 5 | 85 | 10 | 10 | 60 | 0.1 | 17.27 | through hole |
| Example 6 | 0 | 7 | 10 | 60 | 0.1 | 9.41 | through hole |
| Example 7 | 0 | 8 | 10 | 60 | 0.1 | 8.89 | through hole |
| Example 8 | 0 | 10 | 10 | 60 | 0.1 | 8.00 | through hole |
| Example 9 | 0 | 14 | 10 | 60 | 0.1 | 6.67 | through hole |
| Example 10 | 0 | 6 | 10 | 60 | 0.1 | 10.00 | through hole |
| Example 11 | 0 | 15 | 10 | 60 | 0.1 | 6.40 | through hole |
| Example 12 | 0 | 10 | 0.1 | 60 | 0.1 | 3.05 | through hole |
| Example 13 | 0 | 10 | 10 | 60 | 0.1 | 8.00 | through hole |
| Example 14 | 0 | 10 | 20 | 60 | 0.1 | 13.00 | through hole |
| Example 15 | 0 | 10 | 0.05 | 60 | 0.1 | 3.03 | through hole |
| Example 16 | 0 | 10 | 21 | 60 | 0.1 | 13.50 | through hole |
| Example 17 | 0 | 10 | 10 | 30 | 0.1 | 6.50 | through hole |
| Example 18 | 0 | 10 | 10 | 40 | 0.1 | 7.00 | through hole |
| Example 19 | 0 | 10 | 10 | 60 | 0.1 | 8.00 | through hole |
| Example 20 | 0 | 10 | 10 | 100 | 0.1 | 10.00 | through hole |
| Example 21 | 0 | 10 | 10 | 150 | 0.1 | 12.50 | through hole |
| Example 22 | 0 | 10 | 10 | 200 | 0.1 | 15.00 | through hole |
| Example 23 | 0 | 10 | 10 | 20 | 0.1 | 6.00 | through hole |
| Example 24 | 0 | 10 | 10 | 210 | 0.1 | 15.50 | through hole |
| Example 25 | 0 | 10 | 10 | 60 | 0.01 | 14.55 | through hole |
| Example 26 | 0 | 10 | 10 | 60 | 0.05 | 10.67 | through hole |
| Example 27 | 0 | 10 | 10 | 60 | 0.1 | 8.00 | through hole |
| Example 28 | 0 | 10 | 10 | 60 | 0.2 | 5.33 | through hole |
| Example 29 | 0 | 10 | 10 | 60 | 0.25 | 4.57 | through hole |
| Example 30 | 0 | 10 | 10 | 60 | 0.1 | 8.00 | semi-through hole |

TABLE 1-continued

| | | | | | | | |
|---|---|---|---|---|---|---|---|
| Example 31 | 0 | 10 | 10 | 60 | 0.1 | 8.00 | through hole |
| Example 32 | 0 | 10 | 10 | 60 | 0.1 | 8.00 | through hole |
| Example 33 | 0 | 10 | 10 | 60 | 0.1 | 8.00 | through hole |
| Example 34 | 0 | 10 | 10 | 60 | 0.1 | 8.00 | through hole |
| Example 35 | 0 | 10 | 10 | 60 | 0.1 | 8.00 | through hole |
| Example 36 | 0 | 10 | 10 | 60 | 0.1 | 8.00 | through hole |
| Example 37 | 0 | 10 | 10 | 60 | 0.1 | 8.00 | through hole |
| Example 38 | 0 | 14 | 0.2 | 30 | 0.15 | 1.10 | through hole |
| Example 39 | 0 | 7 | 20 | 190 | 0.01 | 48.75 | through hole |
| Comparative Example 1 | / | 6 | 16 | 80 | 0 | 40.00 | no pore |
| Comparative Example 2 | 90 | 7 | 15.2 | 200 | 0.01 | 44.00 | semi-through hole |

| Example | Porosity | Tensile strength of current collector | Capacity retention at 1 C | Number of cycles at discharge capacity of 80% | Pass rate of overcharge test | Pass rate of hotbox test |
|---|---|---|---|---|---|---|
| Example 1 | 20% | 150 Mpa | 97.80% | 850 | 10/10 | 10/10 |
| Example 2 | 20% | 150 Mpa | 97.60% | 820 | 10/10 | 10/10 |
| Example 3 | 20% | 150 Mpa | 95.80% | 780 | 10/10 | 10/10 |
| Example 4 | 20% | 150 Mpa | 98.00% | 830 | 10/10 | 10/10 |
| Example 5 | 20% | 150 Mpa | 97.20% | 792 | 9/10 | 9/10 |
| Example 6 | 20% | 150 Mpa | 95.90% | 750 | 10/10 | 10/10 |
| Example 7 | 20% | 150 Mpa | 97.20% | 792 | 10/10 | 10/10 |
| Example 8 | 20% | 150 Mpa | 96.80% | 800 | 10/10 | 10/10 |
| Example 9 | 20% | 150 Mpa | 97.60% | 1280 | 10/10 | 10/10 |
| Example 10 | 20% | 150 Mpa | 79.70% | 558 | 10/10 | 10/10 |
| Example 11 | 20% | 150 Mpa | 97.30% | 600 | 7/10 | 8/10 |
| Example 12 | 20% | 150 Mpa | 98.00% | 1020 | 10/10 | 10/10 |
| Example 13 | 20% | 150 Mpa | 96.80% | 800 | 10/10 | 10/10 |
| Example 14 | 20% | 150 Mpa | 96.80% | 800 | 10/10 | 10/10 |
| Example 15 | 20% | 150 Mpa | 82.00% | 630 | 10/10 | 10/10 |
| Example 16 | 20% | 150 Mpa | 78.30% | 568 | 10/10 | 10/10 |
| Example 17 | 20% | 150 Mpa | 97.60% | 820 | 10/10 | 10/10 |
| Example 18 | 20% | 150 Mpa | 97.80% | 850 | 10/10 | 10/10 |
| Example 19 | 20% | 150 Mpa | 96.80% | 800 | 10/10 | 10/10 |
| Example 20 | 20% | 150 Mpa | 95.80% | 880 | 10/10 | 10/10 |
| Example 21 | 20% | 150 Mpa | 98.10% | 1200 | 10/10 | 10/10 |
| Example 22 | 20% | 150 Mpa | 95.90% | 850 | 10/10 | 10/10 |
| Example 23 | 20% | 150 Mpa | 78.00% | 530 | 7/10 | 8/10 |
| Example 24 | 20% | 150 Mpa | 77.00% | 510 | 10/10 | 10/10 |
| Example 25 | 20% | 150 Mpa | 95.90% | 750 | 10/10 | 10/10 |
| Example 26 | 20% | 150 Mpa | 95.80% | 780 | 10/10 | 10/10 |
| Example 27 | 20% | 150 Mpa | 96.80% | 800 | 10/10 | 10/10 |
| Example 28 | 20% | 150 Mpa | 98.30% | 768 | 10/10 | 10/10 |
| Example 29 | 20% | 150 Mpa | 98.30% | 568 | 10/10 | 10/10 |
| Example 30 | 20% | 150 Mpa | 98.10% | 900 | 10/10 | 10/10 |
| Example 31 | 10% | 150 Mpa | 98.30% | 768 | 10/10 | 10/10 |
| Example 32 | 20% | 150 Mpa | 96.80% | 800 | 10/10 | 10/10 |
| Example 33 | 30% | 150 Mpa | 97.80% | 850 | 10/10 | 10/10 |
| Example 34 | 50% | 150 Mpa | 97.20% | 792 | 10/10 | 10/10 |
| Example 35 | 20% | 100 Mpa | 95.80% | 870 | 10/10 | 10/10 |
| Example 36 | 20% | 150 Mpa | 96.80% | 800 | 10/10 | 10/10 |
| Example 37 | 20% | 90 Mpa | 95.00% | 620 | 7/10 | 6/10 |
| Example 38 | 20% | 150 Mpa | 98.8% | 600 | 8/10 | 7/10 |
| Example 39 | 20% | 150 Mpa | 80.3 | 570 | 6/10 | 7/10 |
| Comparative Example 1 | 20% | 150 Mpa | 75.70% | 482 | 5/10 | 4/10 |
| Comparative Example 2 | 20% | 150 Mpa | 78.5% | 550 | 2/10 | 3/10 |

The embodiments of this invention have been described above. However, this invention is not limited to the foregoing embodiments. Any modification, equivalent replacement, or improvement made without departing from the principle of this invention shall fall within the protection scope of this invention.

What is claimed is:

1. An electrochemical apparatus, comprising: an electrode plate, wherein the electrode plate has a current collector and an active material layer disposed on at least one surface of the current collector, the active material layer has at least one cylindrical pore with a pore diameter ranging from 0.01 mm to 0.2 mm; the at least one cylindrical pore extending from a first side of the active material layer to a second side of the active material layer, and an included angle between an axial direction of the at least one cylindrical pore and a plane on which a surface of the active material layer lies is $\theta$, wherein $0°\leq\theta<90°$.

2. The electrochemical apparatus according to claim 1, further comprising an electrolyte; and $1.3\leq(D50\times10+THK)/(d\times100+k)\leq45$, wherein D50 is an average particle size of active materials in the active material layer, THK is a thickness of the active material layer, d is the pore diameter of the at least one cylindrical pore, and k is a conductivity of the electrolyte.

3. The electrochemical apparatus according to claim 1, wherein at least one of the following conditions is satisfied:
an average particle size D50 of active materials in the active material layer ranges from 0.1 μm to 20 μm;
a thickness of the active material layer ranges from 30 μm to 200 μm; and
the electrochemical apparatus comprises an electrolyte, wherein a conductivity of the electrolyte ranges from 7 S/m to 14 S/m.

4. The electrochemical apparatus according to claim 1, wherein a direction from the first side of the active material layer to the second side of the active material layer is parallel to a width direction of the electrode plate and parallel to the plane on which the surface of the active material layer lies.

5. The electrochemical apparatus according to claim 4, wherein the at least one cylindrical pore includes a plurality of pores.

6. The electrochemical apparatus according to claim 1, wherein the at least one cylindrical pore includes a plurality of pores, wherein the plurality of pores comprise a pore whose $\theta$ is equal to 0°.

7. The electrochemical apparatus according to claim 1, wherein a porosity of the active material layer ranges from 10% to 50%.

8. The electrochemical apparatus according to claim 1, wherein tensile strength of the current collector is not less than 100 MPa.

9. The electrochemical apparatus according to claim 1, wherein the electrochemical apparatus is a lithium-ion battery.

10. The electrochemical apparatus according to claim 1, wherein an average particle size D50 of active materials in the active material layer ranges from 0.1 μm to 20 μm.

11. The electrochemical apparatus according to claim 1, wherein a thickness of the active material layer ranges from 30 μm to 200 μm.

12. The electrochemical apparatus according to claim 1, wherein the electrochemical apparatus comprises an electrolyte, wherein a conductivity of the electrolyte ranges from 7 S/m to 14 S/m.

13. The electrochemical apparatus according to claim 1, wherein an average particle size D50 of active materials in the active material layer ranges from 0.1 μm to 20 μm, a thickness of the active material layer ranges from 30 μm to 200 μm, and the electrochemical apparatus comprises an electrolyte, wherein a conductivity of the electrolyte ranges from 7 S/m to 14 S/m.

14. An electronic apparatus, comprising an electrochemical apparatus, the electrochemical apparatus comprising an electrode plate, wherein the electrode plate has a current collector and an active material layer disposed on at least one surface of the current collector, the active material layer has at least one cylindrical pore with a pore diameter ranging from 0.01 mm to 0.2 mm; the at least one cylindrical pore extending from a first side of the active material layer to a second side of the active material layer, and an included angle between an axial direction of the at least one cylindrical pore and a plane on which a surface of the active material layer lies is $\theta$, wherein $0°\leq\theta<90°$.

15. The electronic apparatus according to claim 14, wherein the electrochemical apparatus comprises an electrolyte; and $1.3\leq(D50\times10+THK)/(d\times100+k)\leq45$, wherein D50 is an average particle size of active materials in the active material layer, THK is a thickness of the active material layer, d is the pore diameter of the at least one cylindrical pore, and k is a conductivity of the electrolyte.

16. The electronic apparatus according to claim 14, wherein at least one of the following conditions is satisfied:
an average particle size D50 of active materials in the active material layer ranges from 0.1 μm to 20 μm;
a thickness of the active material layer ranges from 30 μm to 200 μm; and
the electrochemical apparatus comprises an electrolyte, wherein a conductivity of the electrolyte ranges from 7 S/m to 14 S/m.

17. The electrochemical apparatus according to claim 14, wherein an average particle size D50 of active materials in the active material layer ranges from 0.1 μm to 20 μm.

18. The electrochemical apparatus according to claim 14, wherein a thickness of the active material layer ranges from 30 μm to 200 μm.

19. The electrochemical apparatus according to claim 14, wherein the electrochemical apparatus comprises an electrolyte, wherein a conductivity of the electrolyte ranges from 7 S/m to 14 S/m.

20. The electrochemical apparatus according to claim 14, wherein an average particle size D50 of active materials in the active material layer ranges from 0.1 μm to 20 μm, a thickness of the active material layer ranges from 30 μm to 200 μm, and the electrochemical apparatus comprises an electrolyte, wherein a conductivity of the electrolyte ranges from 7 S/m to 14 S/m.

* * * * *